United States Patent [19]

Katamoto et al.

[11] Patent Number: 4,781,981

[45] Date of Patent: Nov. 1, 1988

[54] PLATE-LIKE MAGNETOPLUMBITE FERRITE PARTICLES FOR MAGNETIC RECORDING AND PROCESS FOR PRODUCING THE SAME

[75] Inventors: Tsutomu Katamoto; Norimichi Nagai, both of Hiroshima; Yasutaka Ota, Saeki; Katsunori Fujimoto, Hiroshima; Akihiko Hirayama, Onoda; Masao Kiyama, Kyoto, all of Japan

[73] Assignee: Toda Kogyo Corp., Hiroshima, Japan

[21] Appl. No.: 129,628

[22] Filed: Dec. 7, 1987

[30] Foreign Application Priority Data

Dec. 19, 1986 [JP] Japan ................................ 61-305006
Nov. 6, 1987 [JP] Japan ................................ 62-281586

[51] Int. Cl.$^4$ ............................................ C04B 35/26
[52] U.S. Cl. ................................. 428/403; 252/62.59; 252/62.62; 252/62.63; 427/127; 428/693; 428/694
[58] Field of Search ............... 252/62.59, 62.62, 62.63; 427/127; 428/403, 693, 694

[56] References Cited

U.S. PATENT DOCUMENTS

| | | | |
|---|---|---|---|
| 4,259,368 | 3/1981 | Rudolf et al. | 252/62.62 |
| 4,414,124 | 11/1983 | Endo et al. | 252/62.63 |
| 4,561,988 | 12/1985 | Nagai et al. | 252/62.59 |
| 4,584,242 | 4/1986 | Nagai et al. | 252/62.62 |
| 4,683,167 | 7/1987 | Scott et al. | 428/403 |

FOREIGN PATENT DOCUMENTS 55-9671 1/1980 Japan ................................... 427/127

*Primary Examiner*—Jack Cooper
*Attorney, Agent, or Firm*—Nixon & Vanderhye

[57] ABSTRACT

Disclosed herein are Ba-containing plate-like magnetoplumbite type ferrite particles for magnetic recording containing ions of one metal (II) selected from Ni and Zn and ions of one metal (IV) selected from Ti, Sn and Zr, and having zinc incorporated as a solid solution close to the particle surface and the change of coercive force of said particles at a temperature of $-20°$ to $120°$ C. in the range of $-0.5$ to $+0.5$ Oe/°C., and a process for producing the same.

3 Claims, No Drawings

PLATE-LIKE MAGNETOPLUMBITE FERRITE PARTICLES FOR MAGNETIC RECORDING AND PROCESS FOR PRODUCING THE SAME

BACKGROUND OF THE INVENTION

The present invention relates to plate-like magnetoplumbite type ferrite particles for magnetic recording and a process for producing the same. More particularly, the invention relates to the plate-like magnetoplumbite type Ba ferrite particles for magnetic recording having a large magnetization value and a proper coercive force and excellent in temperature stability specified by the change of coercive force at a temperature of $-20°$ to $120°$ C. in the range of $-0.5$ to $+0.5$ Oe/°C., and a process for producing such particles.

With the development of the art of magnetic recording in recent years, the request has grown for the magnetic materials for recording, especially ones for perpendicular magnetic recording comprising the ferromagnetic non-acicular particles having a proper coercive force and a large magnetization value as well as a suitable range of average particle size and excellent temperature stability, as for instance stated in Japanese Patent Application Laid Open (Kokai) No. 55-86103(1980).

Generally, magnetoplumbite type ferrite particles are known as ferromagnetic non-acicular particles.

As a technique for producing plate-like magnetoplumbite type ferrite, there has been known a method in which an alkaline suspension containing Ba or Sr ions and Fe (III) is subjected to a hydrothermal treatment by using an autoclave as reactor (this method being hereinafter referred to simply as autoclaving method).

The plate-like magnetoplumbite type ferrite particles for magnetic recording are required to have a proper particle size, specific magnetic properties such as a suitable coercive force and a large magnetization value, and excellent temperature stability and erasing characteristics.

Regarding, for instance, the particle size of the plate-like magnetoplumbite type ferrite particles for magnetic recording, such particles are required to have as small a diameter as possible, especially not greater than 0.3 $\mu$m.

Such fact is mentioned in, for instance, Japanese Patent Application Laid Open (Kokai) No. 56-125219(1981) which states: "The advantageous utility of perpendicular magnetic recording for longitudinal magnetic recording becomes apparent in the recording wavelength region below 1 $\mu$m. For conducting satisfactory recording and reproduction in such wavelength region, it is desirable that the crystal particle size of the ferrite particle is less than about 0.3 $\mu$m. However, no desired ferromagnetism is provided when the particle size becomes smaller than 0.01 $\mu$m, so that a crystal particle size in a range of 0.01 to 0.3 $\mu$m is practically required."

As for the magnetic properties, the plate-like magnetoplumbite type ferrite particles for magnetic recording are required to have a coercive force usually on the order of 300 to 1,000 Oe. For reducing the coercive force of the plate-like magnetoplumbite type ferrite particles produced by the autoclaving method to a proper level, it has been proposed to substitute part of Fe (III) in the ferrite with Ti (IV) and Co (II) or with Co (II) and divalent metal ions M (II) such as Mn or Zn ions.

As to the magnetization value, it is required that such magnetization value is as large as possible. This is mentioned in, for instance, Japanese Patent Application Laid Open (Kokai) No. 56-149328(1981) which states: "Magnetoplumbite ferrite used as a material for magnetic recording media is required to have as large a degree of saturation magnetization as possible."

Also, the plate-like magnetoplumbite type ferrite particles, from FIG. 4 on page 1,123 of IEEE TRANSACTIONS ON MAGNETICS, MAG-18, No. 6, have a tendency to be increased in coercive force as the temperature rises, and are poor in magnetic (especially coercive force) stability to temperature (hereinafter referred to simply as temperature stability), so that the improvement of such temperature stability is required.

Further, the plate-like magnetoplumbite type ferrite particles have the problem of poor erasing characteristics as for instance described in Japanese Patent Application Laid Open (Kokai) No. 62-46430(1987) which states: "Magnetic media using magnetic powder of barium ferrite, although excellent in short wave recording properties, are poor in erasing characteristics, and especially when used for floppy discs, these magnetic media prove to be poor in overwrite (erasing rate) characteristics and have problems in use." Thus, the improvement of such erasing characteristics is also required.

The plate-like magnetoplumbite type ferrite particles having a large magnetization value and a proper coercive force as well as excellent temperature stability and erasing characteristics are most keenly required at present. In the autoclaving method described above, various kinds of magnetoplumbite type ferrite particles are precipitated according to the reaction conditions. These precipitated particles usually have a hexagonal plate-like shape, and their powder properties such as particle size distribution and average diameter and their magnetic properties such as coercive force, magnetization, temperature stability and erasing characteristics differ depending on the producing conditions.

For example, the plate-like magnetoplumbite type ferrite particles containing Co (II) and Ti (IV) obtained by producing the plate-like Ba ferrite particles containing Co (II) and Ti (IV), in which part of Fe (III) in the ferrite has been substituted with Co (II) and Ti (IV) for reducing the coercive force to a proper level, by using the autoclaving method, and heating and calcining the thus obtained particles are high in the effect of reducing coercive force by Co (II) and Ti (IV) and therefore can be controlled to a proper coercive force by the addition of a small quantity of the additives, so that the drop of magnetization due to the additives is minimized, allowing such particles to have a relatively large value of magnetization, for example, about 50 to 60 emu/g, but the temperature stability of these particles is poor, for example, the change of coercive force at a temperature of $-20°$ to $120°$C. in the range of $+2.5$ to $6.0$ Oe/° C. Thus, the plate-like magnetoplumbite type ferrite particles containing Co (II) and Ti (IV) have a tendency that their coercive force increase as the temperature rises. Such phenomenon can be also forecasted from FIG. 1 on page 1,459 of JOURNAL OF MAGNETISM AND MAGNETIC MATERIALS, No. 15-18 (1980).

Also, the plate-like magnetoplumbite type ferrite particles containing Ni (II) and Ti (IV) or Zn (II) and Ti (IV) obtained by producing the plate-like magnetoplumbite type ferrite particles containing Ni (II) and Ti (IV) or Zn (II) and Ti (IV), in which part of Fe (III) in the ferrite has been substituted with Ni (II) or Zn (II)

and Ti (IV) for reducing the coercive force to a proper level, by using the autoclaving method and heating and calcining the particles are small in the effect of reducing coercive force by Ni (II) and Ti (IV) or Zn (II) and Ti (IV), so that it is necessary to use a large amount of additives for controlling the coercive force to a proper level, resulting in a large drop of magnetization value which becomes about 47 emu/g at highest. The temperature stability of these particles, as forecasted from FIG. 1 in the JOURNAL OF MAGNETISM AND MAGNETIC MATERIALS, is in the range of about +1.0 to +3.0 Oe/°C. (in terms of possible change of coercive force at a temperature of −20° to 120° C.), which is better than that of the plate-like magnetoplumbite type ferrite particles containing Co (II) and Ti (IV) but is still unsatisfactory.

As means for improving temperature stability of the plate-like magnetoplumbite type ferrite particles containing the elements for reducing the coercive force such as Co (II) and Ti (IV), there are known, for example, the methods disclosed in Japanese Patent Application Laid Open (Kokai) Nos. 61-152003(1986) and 62-132732(1987).

According to the method of Japanese Patent Application Kokai No. 61-152003(1986), the plate-like magnetoplumbite type ferrite particles containing the elements for reducing the coercive force such as Co (II) and Ti (IV) are subjected to a heat-treatment at 300°–700° C. in a reducing atmosphere. But this heat-treatment enhances the coercive force more than twice that before the heat treatment, making it difficult to control the coercive force to a proper level.

According to the method of Japan Patent Application Kokai No. 62-132732(1987), the aspect magnetoplumbite type ferrite particles are produced so that their average diameter become less than 1.0 μm, their thickness of the C-axis direction become less than 0.2 μm and their plate-like ratio (average diameter of plate surface/thickness of the C-axis direction) become greater than 5. This method, therefore, has the defect that the improvement of temperature stability is subject to the limitations by the form of particles.

Also, the erasing characteristics of the conventional plate-like magnetoplumbite type ferrite particles containing the elements for reducing the coercive force such as Co (II) and Ti (IV) had a specific corelation with coercive force, that is, there was a tendency that the erasing characteristics be deteriorated as the coercive force increases, the erasing characteristic becoming about 40 dB when the coercive force is about 500 Oe, the erasing characteristic becoming about 30 dB when the coercive force is about 700 Oe, and the erasing characteristic becoming about 20 dB when the coercive force is about 900 Oe. A method for improving the erasing characteristics of the plate-like magnetoplumbite type ferrite particles is disclosed in the Japanese Patent Application Laid Open (Kokai) No. 62-46430(1987). According to this method, the plate-like magnetoplumbite type ferrite particles are produced so that their average diameter become less than 0.2 μm, preferably less than 0.15 μm, more preferably less than 0.1 μm, and the aspect ratio (average diameter of the plate surface/thickness of the C-axis direction) become greater than 6, more preferably greater than 8, but this method has the defect that the improvement of erasing characteristics is subject to the limitations by the form of particles.

Thus, the establishment of a process capable of producing the plate-like Ba ferrite particles having a proper coercive force and a large magnetization and also improved in temperature stability and erasing characteristics without restrictions by the form of particles has been strongly required.

As a result of many studies for obtaining the plate-like magnetoplumbite type ferrite particles having a proper coercive force and a large magnetization value and also improved in temperature stability and erasing characteristics without restrictions by the form of particles, it has been found that the plate-like magnetoplumbite type ferrite particles containing a metal (II) and a metal (IV) and having zinc incorporated as a solid solution close to the particle surface, obtained by a process comprsing subjecting an alkaline iron hydroxide (III) suspension containing ions of one metal (II) selected from Ni and Zn, ions of one metal (IV) selected from Ti, Sn and Zr, and Ba or Sr ions to an autoclaving treatment at a temperature of from 150° to 330° C. to produce the plate-like magnetoplumbite type ferrite particles containing the metal (II) and metal (IV), suspending the particles in a zinc-containing aqueous solution of pH 4.0–12.0 to obtain the plate-like magnetoplumbite type ferrite particles containing the metal (II) and metal (IV) and having a hydroxide of zinc deposited on the particle surface, filtering and drying the particles, and then heating and calcining them at a temperature in the range of 600°–900° C., have a coercive force suited for magnetic recording and a large magnetization value and are also excellent in temperature stability and erasing characteristics. The present invention was attained on the basis of such finding.

SUMMARY OF THE INVENTION

In a first aspect of the present invention, there is provided Ba-containing plate-like magnetoplumbite type ferrite particles for magnetic recording containing ions of one metal (II) selected from Ni and Zn and ions of one metal (IV) selected from Ti, Sn and Zr, and having zinc incorporated as a solid solution close to the particle surface and the change of coercive force of said particles at a temperature of −20° to 120° C. in the range of −0.5 to +0.5 Oe/°C.

In a second aspect of the present invention, there is provided a process for producing plate-like magnetoplumbite type ferrite particles for magnetic recording, which comprises the steps of subjecting an alkaline iron hydroxide (III) suspension containing ions of one metal (II) selected from Ni and Zn, ions of one metal (IV) selected from Ti, Sn and Zr, and Ba or Sr ions to an autoclaving treatment at a temperature in the range of 150° to 330° C. to produce the plate-like magnetoplumbite type ferrite particles containing the metals (II) and (IV), suspending said particles in a zinc-containing aqueous solution of pH 4.0–12.0 to obtain the plate-like magnetoplumbite type ferrite particles containing the metals (II) and (IV) and having a hydroxide of zinc deposited on the particle surface, after filtering said particles, heating and calcining said particles at a temperature in the range of 600° to 900° C. so that zinc is incorporated as a solid solution close to the particle surface.

DETAILED DESCRIPTION OF THE INVENTION

The fine particles for magnetic recording according to the present invention are the plate-like magnetoplumbite type ferrite particles for magnetic recording comprising the Ba-containing plate-like magnetoplumbite type ferrite particles containing ions of one metal (II) selected from Ni and Zn and ions of one metal (IV) selected from Ti, Sn and Zr and having zinc incorporated as a solid solution close to the particle surface and the change of coercive force at a temperature of −20° to 120° C. in the range of −0.5 to +0.5 Oe/°C. The process for producing the plate-like magnetoplumbite type ferrite particles for magnetic recording according to the present invention comprises the steps of subjecting an alkaline iron hydroxide (III) suspension containing ions of one metal (II) selected from Ni and Zn, ions of one metal (IV) selected from Ti, Sn and Zr and Ba or Sr ions to an autoclaving treatment at a temperature in the range of 150-°330° C. to produce the plate-like magnetoplumbite type ferrite particles containing the metal (II) and metal (IV), suspending the thus obtained particles in a zinc-containing aqueous solution of pH 4.0–12.0 to obtain the plate-like magnetoplumbite type ferrite particles containing the metal (II) and metal (IV) and having a hydroxide of zinc deposited on the particle surface, filtering and drying the thus obtained particles, and then heating and calcining them at a temperature in the range of 600°–900° C. so that zinc is incorporated as a solid solution close to the particle surface.

The plate-like magnetoplumbite type ferrite particles of the present invention have a temperature stability specified by the range of −0.5 to +0.5 Oe/°C. in change of coercive force at a temperature of −20° to 120° C.

The plate-like magnetoplumbite type ferrite particles of the present invention are more than 10 dB better in erasing characteristics than the conventional plate-like magnetoplumbite type ferrite particles having the same level of coercive force.

The reason why the plate-like magnetoplumbite type ferrite particles with excellent temperature stability and erasing characteristics can be obtained by the process of the present invention is not yet definitely known, but in view of the fact that excellent temperature stability and erasing characteristics can not be obtained in both cases of the plate-like magnetoplumbite type ferrite particles containing one metal (II) selected from Ni and Zn and one metal (IV) selected from Ti, Sn and Zr, and the plate-like magnetoplumbite type ferrite particles containing no metals (II) and (IV) and having zinc incorporated as a solid solution close to the particles surface as shown in the Comparative Examples, the present inventors consider that the realization of producing the plate-like magnetoplumbite type ferrite particles excellent in both temperature stability and erasing characteristics according to the present invention owes to the synergistic effect of the specific metals (II) and (IV) substituting part of Fe (III) in the ferrite and zinc incorporated as a solid solution close to the particle surface.

In the plate-like magnetoplumbite type ferrite particles of the present invention, zinc is incorporated as a solid solution close to the particle surface, so that it is possible to effectively enlarge the magnetization value of the particles while reducing the coercive force.

Consequently, even when using the elements with a small coercive force reducing effect, such as Ni (II) - Ti (IV), Zn (II) - Ti (IV), etc., it is possible to effectively control the coercive force to a proper level while maintaining a large magnetization.

In the Ba-containing plate-like magnetoplumbite type ferrite particles according to the present invention, zinc is incorporated as a solid solution close to the surfaces of the particles containing one metal (II) selected from Ni and Zn and one metal (IV) selected from Ti, Sn and Zr.

One metal (II) selected from Ni and Zn is contained in an amount of 4.0 to 14.0 atom %, preferably 5.0 to 13.0 atom % based on Fe (III). When its content is less than 4.0 atom %, it is impossible to fully attain the object of the present invention. Also, the coercive force is increased and can hardly be controlled to a proper level. When the content exceeds 14.0 atom %, although the object of the present invention can be attained, the magnetization of the particles becomes too low.

One of the specified metals (IV) is contained in an amount of 2.0 to 14.0 atom %, preferably 3.0 to 13.0 atom % based on Fe (III). When its content is less than 2.0 atom %, it is impossible to fully attain the object of the present invention. Also, the coercive force is increased and can hardly be controlled to a proper level. When the content exceeds 14.0 atom %, although the object of the present invention can be attained, the magnetization of the particles becomes too low.

The plate-like magnetoplumbite type ferrite particles provided according to the present invention are the Ba-containing ferrite particles, Sr-containing ferrite particles, or the ferrite particles containing both Ba and Sr.

The amount of zinc incorporated as a solid solution in the plate-like magnetoplumbite type ferrite particles according to the present invention is 0.2 to 6.0% by weight, preferably 0.5 to 5.0% by weight. When its amount is less than 0.2% by weight, the object of the present invention can not be fully attained. It is possible to attain the object of the present invention even when the amount of zinc exceeds 5.0% by weight, but it is meaningless to incorporate zinc in a greater amount then actually needed.

The Ba-containing plate-like magnetoplumbite type ferrite prticles according to the present invention can be obtained by a process comprising the steps of subjecting an alkaline iron hydroxide (III) suspension containing ions of one metal (II) selected from Ni and Zn, ions of one metal (IV) selected from Ti, Sn and Zr, and Ba ions or Sr ions to an autoclaving treatment at a temperature in the range of 150° to 330° C., preferably 180° to 300° C., to produce the plate-like magnetoplumbite type ferrite particles containing the metals (II) and (IV), suspending these particles in a zinc-containing aqueous solution of pH 4.0–12.0 to obtain the plate-like magnetoplumbite type ferrite particles containing the metals (II) and (IV) and having a hydroxide of zinc deposited on the particle surface, filtering and drying the particles, and then calcining them by heating at a temperature in the range of 600° to 900° C., preferably 700° to 900° C.

The alkaline iron hydroxide (III) suspension used in the process of the present invention can be produced by reacting an Fe (III) salt and an alkaline aqueous solution. Iron nitrates, iron chloride and the like can be used as the Fe (III) salt.

The Ba ions usable in the process of the present invention include the ions of barium hydroxide, barium chloride, barium nitrate and the like.

As the Sr ions, there can be used the ions of strontium hydroxide, strontium chloride, strontium nitrate and the like.

The reaction temperature used in the process of the present invention is from 150° to 330° C., preferably 180° to 300° C. When the reaction temperature is below 150° C., it becomes difficult to produce the desired plate-like magnetoplumbite type ferrite particles. It is possible to produce the plate-like magnetoplumbite type ferrite particles even when the reaction temperature exceeds 330° C., but when considering the safety of the apparatus, the upper limit of reaction temperature should be set at about 330° C.

As the metal (II) selected from Ni and Zn, there can be used chlorides, nitrates, acetates, etc., of Ni and Zn.

The metal (II) is added in an amount of 4.0 to 14.0 atom %, preferably 0.5 to 13.0 atom % based on Fe (III). The added metal (II) is contained substantially in its entirety in the Ba-containing plate-like magnetoplumbite type ferrite particles. When its content is less than 4.0 atom %, it is impossible to fully attain the object of the present invention. Also, the coercive force is increased and can hardly be controlled to a proper level. When the metal (II) content exceeds 14.0 atom %, although it is possible to attain the object of the present invention, the magnetization of the particles becomes too low.

As the metal (IV) used in the process of the present invention, Ti compounds such as titanium tetraoxide and titanium sulfate, Sn compounds such as tin tetrachloride and sodium stannate, and Zr compounds such as zirconium oxychloride can be used.

The metal (IV) is added in an amount of 2.0 to 14.0 atom %, preferably 0.3 to 13.0 atom % based on Fe (III). The added metal (IV) is contained substantially in its entirety in the Ba-containing plate-like magnetoplumbite type ferrite particles. When its content is less than 2.0 atom %, it is impossible to fully attain the object of the present invention. Also, the coercive force is increased and can hardly be controlled to a proper level. When the content exceeds 14.0 atom %, although it is possible to attain the object of the present invention, the magnetization of the particles becomes too low.

Depositing of a hydroxide of zinc in the present invention can be accomplished by suspending the plate-like magnetoplumbite type ferrite particles in a zinc-containing aqueous solution of pH 4.0–12.0.

As the zinc-containing aqueous solution, there can be used the solutions of zinc halides such as zinc chloride, zinc bromide and zinc iodide, zinc nitrate, zinc sulfate, zinc acetate and the like.

When the pH is below 4 or above 12, it becomes difficult to effectuate desired deposition of zinc.

The heating and calcining temperature used in the present invention is 600° to 900° C. When this temperature is below 600° C., incorporation of zinc as a solid solution to the particle surface can not be effected sufficiently. When the temperature is higher than 900° C., there takes place excess sintering of the particles and between the particles.

When carrying out calcining in the present invention, the particle surface may be beforehand coated with an Si compound, Al compound, P compound or the like having a sintering-preventive effect.

A known flux may be used in carrying out calcining in the present invention. As such flux, there can be used, for example, halides and sulfates of alkali metals and alkali earth metals either singly or in combination.

The plate-like magnetoplumbite type ferrite particles according to the present invention have a large magnetization value and a proper coercive force and are also excellent in temperature stability specified by the change of coercive force at a temperature of −20° to 120° C. in the range of −0.5 to +0.5 Oe/°C., and further they have excellent erasing characteristics, so that these particles are best suited for use as the plate-like magnetoplumbite type ferrite particles for magnetic recording which are most keenly required in the art at present.

The plate-like magnetoplumbite type ferrite particles according to the present invention have an average diameter of 0.05 to 0.25 μm, preferably 0.08 to 0.20 μm, a coercive force of 500 to 1,000 Oe, preferably 550 to 980 Oe, a magnetization greater than 50 emu/g, preferably greater than 51.6 emu/g, and an erasing characteristic value of greater than 25 dB, preferably greater than 27 dB.

The present invention will hereinafter be described with reference to the examples and comparative examples, but the invention is in no way limited by these examples.

In the following Examples and Comparative Examples, the average particle diameter was measured by the electron microphotographs.

The magnetization and coercive force of the particles were measured in a powdery state in a magnetic field of 10 KOe.

The temperature stability of the particles was shown by the value (Oe° C.) obtained by dividing the difference between coercive force at −20° C. and that at 120° C. by the temperature difference (140° C.).

The erasing characteristics of the particles were shown by the value determined according to the "method for determining erasing characteristics and magnetization of magnetic powders" described on pages 152–153 of "A Summary of Lectures at the Spring, 1986, Meeting" of Journal of the Japan Society of Powder and Powder Metallurgy. That is, the erasing characteristics were determined by applying a DC magnetic field of 10 KOe to the sample, measuring the residual magnetization (Mr), then setting the sample in an erasing device, applying an erasing magnetic field from 1,000 Oe to zero, measuring the residual magnetization (Me), and calculating the value of 20 log Me/Mr (dB).

Production of plate-like magnetoplumbite tyoe ferrite particles from an aqueous solution

EXAMPLE 1

An alkaline suspension of 5.0 mol of $Fe(NO_3)_3$, 0.25 mol of $Ni(NO_3)_2$ [corresponding to 5.0 atom % based on Fe (III)], 0.25 mol of $TiCl_4$, 0.5 mol of $Ba(OH)_2 \cdot 8H_2O$ and 37.5 mol of NaOH was heated to 300° C. in an autoclave and maintained at this temperature under mechanical stirring for 3 hours, thereby obtaining a ferromagnetic brown precipitate.

After cooled to room temperature, the precipitate was filtered, washed well with water and dried.

Fluorescent X-ray analysis and X-ray diffraction of the obtained ferromagnetic brown powder showed that the powder comprised the Ba ferrite particles containing 5.0 atom % of Ni and 5.0 atom % of Ti based on Fe (III).

Examples 2–9 and Comparative Examples 1–3

Plate-like magnetoplumbite type ferrite particles were obtained in the same process as Example 1 except that the kind of the ferric salt solution, the kind and amount of Ba salt or Sr salt solution, the kind and amount of metal (II) compound, the kind and amount of metal (IV) compound, and the reaction temperature and time were changed. The principal production conditions and the properties of the obtained particles are shown in Table 1.

Production process of plate-like magnetoplumbite type of ferrite particles obtained after heat treatment

EXAMPLE 10

100 g of plate-like Ba ferrite particles containing Ni and Ti obtained in Example 1 was dispersed and mixed in an aqueous solution of 0.12 mol of zinc chloride and, after the hydroxide of zinc has been deposited on the particle surface at pH 9, the particles were filtered out, dried and then heated for calcining at 900° C. for one hour.

The resulting particles were determined to have an average diameter of 0.12 μm by electron microscopical observation. As for the magnetic properties of these particles, they showed a coercive force Hc of 920 Oe and a magnetization of 60.5 emu/g. The particles also showed a temperature stability of +0.4 Oe/°C. and an erasing characteristic value of 32 dB. The result of fluorescent X-ray analysis of said particles showed that they contained 5.0 atom % of Co and 5.0 atom % of Ti, based on Fe, and 4.9% by weight of Zn based on the final product.

Since the chemical analysis of the particles detected no zinc oxide and zinc hydroxide which are normally extracted on heating in an alkaline solution, it was confirmed that zinc has been turned into a solid solution.

Examples 11–18 and Comparative Examples 4–11

Plate-like magnetoplumbite type ferrite particles were obtained in the same process as Example 10 except that the kind and amount of Zn added, heat treatment temperature and time, use of flux, and kind and amount of flux when used were changed in various ways.

The main production conditions and the properties of the obtained particles are shown in Table 2.

TABLE 1

| | | Production of magnetoplumbite type ferrite particles from aqueous solution | | | | |
|---|---|---|---|---|---|---|
| Example and Comp. Example | Ferric salt solution Kind | Ba salt or Sr salt solution Kind | Amount (mol) | Metal (II) compound Kind | Amount (mol) | Metal (II)/ Fe (atom %) |
| Example 1 | Fe(NO$_3$)$_3$ | Ba(OH)$_2$ | 0.50 | Ni(NO$_3$)$_2$ | 0.25 | 5.0 |
| Example 2 | FeCl$_3$ | BaCl$_2$ | 0.48 | NiCl$_2$ | 0.50 | 10.0 |
| Example 3 | FeCl$_3$ | Ba(NO$_3$)$_2$ | 0.47 | (CH$_3$COOH)Ni | 0.60 | 12.0 |
| Example 4 | Fe(NO$_3$)$_3$ | Ba(OH)$_2$ | 0.50 | Zn(NO$_3$)$_2$ | 0.25 | 5.0 |
| Example 5 | FeCl$_3$ | BaCl$_2$ | 0.48 | ZnCl$_2$ | 0.50 | 10.0 |
| Example 6 | FeCl$_3$ | Ba(OH$_3$)$_3$ | 0.47 | (CH$_3$COOH)Zn | 0.60 | 12.0 |
| Example 7 | Fe(NO$_3$)$_3$ | Sr(OH)$_2$ | 0.50 | Ni(NO$_3$)$_2$ | 0.3 | 6.0 |
| Example 8 | FeCl$_3$ | SrCl$_2$ | 0.48 | ZnCl$_2$ | 0.6 | 12.0 |
| Example 9 | FeCl$_3$ | BaCl$_2$ SrCl$_2$ | 0.35 0.15 | NiCl$_2$ | 0.50 | 10.0 |
| Comp. Example 1 | Fe(NO$_3$)$_3$ | Ba(OH)$_2$ | 0.48 | Ni(NO$_3$)$_2$ | 0.15 | 3.0 |
| Comp. Example 2 | Fe(NO$_3$)$_3$ | Ba(OH)$_2$ | 0.59 | Ni(NO$_3$)$_2$ | 0.75 | 15.0 |
| Comp. Example 3 | Fe(NO$_3$)$_3$ | Ba(OH)$_2$ | 0.50 | — | — | — |

| | Production of magnetoplumbite type ferrite particles from aqueous solution | | | | | Produced plate-like magnetoplumbite type ferrite particles | | |
|---|---|---|---|---|---|---|---|---|
| Example and Comp. Example | Metal (IV) compound Kind | Amount (mol) | Metal (IV)/ Fe (atom %) | Temp. (°C.) | Time (hr) | Metal (II)/ Fe content (atom %) | Metal (IV)/ Fe content (atom %) | Average diameter (μm) |
| Example 1 | TiCl$_4$ | 0.25 | 5.0 | 300 | 3 | 5.0 | 5.0 | 0.11 |
| Example 2 | Sodium stannate | 0.50 | 10.0 | 200 | 2 | 10.0 | 10.0 | 0.08 |
| Example 3 | Zirconium oxychloride | 0.20 | 4.0 | 250 | 1 | 12.0 | 4.0 | 0.10 |
| Example 4 | TiCl$_4$ | 0.25 | 5.0 | 300 | 3 | 5.0 | 5.0 | 0.09 |
| Example 5 | Sodium Stannate | 0.50 | 10.0 | 180 | 2 | 10.0 | 10.0 | 0.07 |
| Example 6 | Zirconium oxychloride | 0.20 | 4.0 | 250 | 1 | 12.0 | 4.0 | 0.11 |
| Example 7 | TiCl$_4$ | 0.3 | 6.0 | 190 | 4 | 6.0 | 6.0 | 0.18 |
| Example 8 | Sodium stannate | 0.6 | 12.0 | 240 | 3 | 12.0 | 12.0 | 0.20 |
| Example 9 | TiCl$_4$ | 0.5 | 10.0 | 280 | 3 | 10.0 | 10.0 | 0.15 |
| Comp. Example 1 | TiCl$_4$ | 0.15 | 3.0 | 300 | 3 | 3.0 | 3.0 | 0.12 |
| Comp. Example 2 | TiCl$_4$ | 0.75 | 15.0 | 300 | 3 | 15.0 | 15.0 | 0.13 |
| Comp. Example 3 | — | — | — | 300 | 3 | — | — | 0.12 |

TABLE 2

| | Kind of starting material | Zn solid solution treatment | | | | |
|---|---|---|---|---|---|---|
| Example and Comp. | (Example No. | Zn added Amount | Heat-treatment Temp. | Time | Flux | Amount |

TABLE 2-continued

| Example | & Comp. Ex. No.) | Kind | (mol) | (°C.) | (hr) | Kind | (g) |
|---|---|---|---|---|---|---|---|
| Example 10 | Example 1 | ZnCl$_2$ | 0.12 | 900 | 1 | — | — |
| Example 11 | Example 2 | Zn(NO$_3$)$_2$ | 0.08 | 800 | 2 | NaCl | 100 |
| Example 12 | Example 3 | (CH$_3$COO)Zn | 0.04 | 850 | 3 | KCl | 150 |
| Example 13 | Example 4 | ZnCl$_2$ | 0.13 | 800 | 2 | — | — |
| Example 14 | Example 5 | Zn(NO$_3$)$_2$ | 0.08 | 800 | 3 | BaCl$_2$ | 100 |
|  |  |  |  |  |  | NaCl | 50 |
| Example 15 | Example 6 | (CH$_3$COO)Zn | 0.02 | 750 | 1 | KCl | 80 |
|  |  |  |  |  |  | NaF | 20 |
| Example 16 | Example 7 | ZnCl$_2$ | 0.11 | 850 | 1 | — | — |
| Example 17 | Example 8 | Zn(NO$_3$)$_2$ | 0.01 | 800 | 2 | NaCl | 200 |
| Example 18 | Example 9 | ZnSO$_4$ | 0.05 | 800 | 3 | KCl | 30 |
| Comp. Example 4 | Example 1 | — | — | 900 | 1 | — | — |
| Comp. Example 5 | Example 2 | — | — | 800 | 2 | NaCl | 100 |
| Comp. Example 6 | Example 3 | — | — | 850 | 3 | KCl | 150 |
| Comp. Example 7 | Example 4 | — | — | 800 | 2 | — | — |
| Comp. Example 8 | Example 7 | — | — | 850 | 1 | — | — |
| Comp. Example 9 | Comp. Example 1 | — | — | 850 | 1 | — | — |
| Comp. Example 10 | Comp. Example 2 | — | — | 800 | 3 | NaCl | 100 |
| Comp. Example 11 | Comp. Example 3 | ZnCl$_2$ | 0.07 | 800 | 1 | — | — |

| Example and Comp. Example | Content of Zn solid solution (wt %) | Plate-like magnetoplumbite type ferrite particles | | | | |
|---|---|---|---|---|---|---|
|  |  | Average diameter (μm) | Coercive force Hc (Oe) | Magnetization (δs) (emu/g) | Temp. stability (Oe/°C.) | Erasing characteristics (dB) |
| Example 10 | 4.9 | 0.12 | 920 | 60.5 | +0.4 | 32 |
| Example 11 | 3.3 | 0.10 | 550 | 54.3 | +0.2 | 55 |
| Example 12 | 1.6 | 0.11 | 730 | 57.1 | +0.5 | 46 |
| Example 13 | 5.0 | 0.10 | 980 | 58.9 | −0.4 | 27 |
| Example 14 | 3.2 | 0.08 | 710 | 55.8 | −0.5 | 48 |
| Example 15 | 0.7 | 0.11 | 830 | 52.9 | −0.1 | 37 |
| Example 16 | 4.5 | 0.18 | 940 | 56.0 | +0.4 | 31 |
| Example 17 | 0.5 | 0.20 | 650 | 51.6 | −0.5 | 52 |
| Example 18 | 2.2 | 0.15 | 720 | 52.0 | +0.3 | 45 |
| Comp. Example 4 | — | 0.12 | 2190 | 57.1 | +1.5 | * |
| Comp. Example 5 | — | 0.10 | 1150 | 46.3 | −1.5 | 9 |
| Comp. Example 6 | — | 0.11 | 1480 | 52.3 | +1.8 | * |
| Comp. Example 7 | — | 0.10 | 2220 | 54.5 | +2.3 | * |
| Comp. Example 8 | — | 0.18 | 1870 | 52.4 | +1.2 | * |
| Comp. Example 9 | — | 0.13 | 2480 | 58.5 | +2.2 | * |
| Comp. Example 10 | — | 0.15 | 860 | 42.2 | −2.4 | 20 |
| Comp. Example 11 | — | 0.13 | 1110 | 65.2 | +2.8 | 10 |

*Erasing characteristics were undeterminable because of high coercive force.

What is claimed is:

1. A process for producing Ba- and/or Sr-containing plate-like magnetoplumbite ferrite particles for magnetic recording, which comprises the steps of:
    (a) subjecting an alkaline iron hydroxide (III) suspension containing ions of one metal (II) selected from Ni and Zn in an amount of 4.0 to 14.0 atom % based upon Fe (III) ions, ions of one metal (IV) selected from Ti, Sn and Zr in an amount of 2.0 to 14.0 atom % based upon Fe (III) ions and Ba and/or Sr ions to an autoclaving treatment at a temperature in the range of 150° to 330° C. to produce Da- and/or Sr-containing plate-like magnetoplumbite ferrite particles containing the metals (II) and (IV);
    (b) suspending said particles in a zinc-containing aqueous solution of pH 4.0–12.0 to obtain the plate-like magnetoplumbite type ferrite particles containing the metals (II) and (IV) and having a hydroxide of zinc deposited on the particle surface;
    (c) filtering said particles;
    (d) heating and calcining said particles at a temperature in the range of 600° to 900° C. so that from 0.2 to 6.0% by weight zinc is incorporated as a solid solution close to the particle surface,
    said particles having an average diameter of 0.05 to 0.25 μm, a coercive force of 500 to 1,000 Oe, a magnetization of not less than 50 emu/g, an erasing characteristic value of not less than 25 dB, and a change of coercive force at a temperature of −20° to 120° C. in the range of −0.5 to +0.5 Oe/°C.

2. The process of claim 1 wherein the particles are heated in step (d) in the presence of at least one flux selected from halides and sulfates of alkali metals and alkali earth metals.

3. Ba- and/or Sr-containing plate-like magnetoplumbite ferrite particles for magnetic recording containing ions of one metal (II) selected from Ni and Zn and ions of one metal (IV) selected from Ti, Sn and Zr, the metal (II) being present in an amount of from 4.0 to 14.0 atom % based on Fe (III) ions contained in the ferrite and the metal (IV) being present in an amount of from 2.0 to 14.0 atom % based upon the Fe (III) ions contained in the ferrite, said metal (II) and said metal (IV) substituting for part of the Fe (III), and having zinc incorporated as a solid solution close to the particle surface, said particles having an average diameter of 0.05 to 0.25 μm, a coercive force of 500 to 1,000 Oe, a magnetization of not less than 50 emu/g, an erasing characteristic value of not less than 25 dB, and a change of coercive force at a temperature of −20° to 120° C. in the range of −0.5 to +0.5 Oe/°C., said particles prepared by a process which comprises the steps of:
(a) subjecting an alkaline iron hydroxide (III) suspension containing ions of one metal (II) selected from Ni and Zn in an amount of 4.0 to 14.0 atom % based upon Fe (III) ions,
ions of one metal (IV) selected from Ti, Sn and Zr in an amount of 2.0 to 14.0 atom % based upon Fe (III) ions, and Ba and/or Sr ions to an autoclaving treatment at a temperature in the range of 150° to 333° C. to produce Ba- and/or Sr containing plate-like magnetoplumbite ferrite particles containing the metals (ii) and (IV);
(b) suspending said particles in a zinc-containing aqueous solution of pH 4.0–12.0 to obtain the plate-like magnetoplumbite-type ferrite particles containing the metals (II) and (IV) and having a hydroxide of zinc deposited on the particle surface;
(c) filtering said particles, and
(d) heating and calcining said particles at a temperature in the range of 600° to 900° C. so that from 0.2 to 6% by weight zinc is incorporated as a solid solution close to the particle surface.

* * * * *